United States Patent
Hollweg et al.

(10) Patent No.: US 9,898,876 B2
(45) Date of Patent: Feb. 20, 2018

(54) METHOD AND APPARATUS FOR VEHICLE USAGE RECORDING

(71) Applicant: TomTom Telematics B.V., Amsterdam (NL)

(72) Inventors: Dirk Hollweg, Leipzig (DE); Mathias Linke, Leipzig (DE); Michael Suess, Leipzig (DE)

(73) Assignee: TOMTOM TELEMATICS B.V., Amsterdam (NL)

( * ) Notice: Subject to any disclaimer, the term of this patent is extended or adjusted under 35 U.S.C. 154(b) by 271 days.

(21) Appl. No.: 14/652,792

(22) PCT Filed: Dec. 17, 2013

(86) PCT No.: PCT/EP2013/076972
§ 371 (c)(1),
(2) Date: Jun. 17, 2015

(87) PCT Pub. No.: WO2014/095919
PCT Pub. Date: Jun. 26, 2014

(65) Prior Publication Data
US 2016/0196697 A1 Jul. 7, 2016

(30) Foreign Application Priority Data
Dec. 17, 2012 (GB) .................................. 1222708.8

(51) Int. Cl.
*G01C 21/00* (2006.01)
*G07C 5/00* (2006.01)
(Continued)

(52) U.S. Cl.
CPC ............. *G07C 5/008* (2013.01); *G01C 21/30* (2013.01); *G06K 9/00791* (2013.01)

(58) Field of Classification Search
CPC ......... H04M 1/72569; H04M 2250/22; H04M 1/274508; H04M 1/274516; H04M 1/27455
(Continued)

(56) References Cited

U.S. PATENT DOCUMENTS 6,301,533 B1 * 10/2001 Markow .............. G07C 5/0858
340/438
6,819,301 B2 11/2004 Nagamatsu et al.
(Continued)

FOREIGN PATENT DOCUMENTS

CN 101886929 A 11/2010
CN 102046427 A 5/2011
(Continued)

OTHER PUBLICATIONS

Search Report dated May 23, 2013 for United Kingdom Patent Application No. PCT/EP2013/076972.
(Continued)

*Primary Examiner* — Redhwan K Mawari

(57) ABSTRACT

A computer-implemented method of providing suggested entries for a candidate journey in a vehicle logbook, comprising selecting one or more neighbour journeys based on a location of one or more end-points of the candidate journey and the one or more neighbour journeys, determining an accuracy value indicative of a match between each neighbour journey and the candidate journey based on one or more attributes of each neighbour journey and the candidate journey, and providing at least one suggested entry for the candidate journey in the vehicle logbook based on the accuracy value associated

16 Claims, 8 Drawing Sheets

(51) Int. Cl.
*G01C 21/30* (2006.01)
*G06K 9/00* (2006.01)

(58) Field of Classification Search
USPC .......................................................... 701/533
See application file for complete search history.

(56) References Cited

U.S. PATENT DOCUMENTS

| | | | |
|---|---|---|---|
| 6,856,933 | B1 | 2/2005 | Callaghan |
| 7,522,069 | B2 | 4/2009 | Tunnell et al. |
| 7,885,761 | B2 * | 2/2011 | Tajima ............... G01C 21/3617 |
| | | | 701/439 |
| 8,838,373 | B2 | 9/2014 | Chen |
| 2004/0093392 | A1 * | 5/2004 | Nagamatsu ............ H04L 67/18 |
| | | | 709/218 |
| 2005/0125148 | A1 * | 6/2005 | Van Buer ........... G01C 21/3617 |
| | | | 701/468 |
| 2008/0030376 | A1 | 2/2008 | Tunnell et al. |
| 2012/0130630 | A1 | 5/2012 | Tang et al. |
| 2012/0130636 | A1 | 5/2012 | Westerlage |
| 2012/0130817 | A1 * | 5/2012 | Bousaleh ........... G06Q 30/0261 |
| | | | 705/14.58 |
| 2014/0278070 | A1 * | 9/2014 | McGavran ............. G01C 21/00 |
| | | | 701/465 |
| 2015/0363984 | A1 | 12/2015 | Garcoa Manchado |
| 2016/0196697 | A1 * | 7/2016 | Hollweg ................ G01C 21/30 |
| | | | 701/32.3 |

FOREIGN PATENT DOCUMENTS

| | | |
|---|---|---|
| CN | 102682375 A | 9/2012 |
| WO | 2009027972 A1 | 3/2009 |
| WO | 2012067712 A1 | 5/2012 |

OTHER PUBLICATIONS

International Search Report dated Apr. 10, 2014 for International Patent Application No. 1222708.8.

* cited by examiner

METHOD AND APPARATUS FOR VEHICLE USAGE RECORDING

CROSS-REFERENCE TO RELATED APPLICATIONS

The present application is the National Stage of International Application No. PCT/EP2013/076972, filed Dec. 17, 2013 and designating the United States, which claims priority from United Kingdom Patent Application No. 1222708.8, filed on Dec. 17, 2012. The entire content of these applications is incorporated herein by reference.

FIELD OF THE INVENTION

The present invention relates to a computer-implemented method, and associated computing device, for providing suggested entries for a candidate journey in a vehicle logbook to a user.

BACKGROUND TO THE INVENTION

It is sometimes desired to monitor usage of a vehicle. For example, it may be desired to record details of business journeys made using a vehicle, such as for expenses or taxation purposes. Alternatively, where the vehicle is a company vehicle, for example, it may be necessary to record details of all journeys made using the vehicle.

Traditionally a paper record, sometimes referred to as a logbook, may be associated with a vehicle in which vehicle users write details of journeys made using the vehicle. More recently software applications for use on mobile devices such as mobile telephones and the like have been available as an electronic version of the paper logbook. However the user is still required to enter details of each journey which can be time consuming and may lead to incomplete records being maintained.

It is an object of embodiments of the invention to at least mitigate one or more of the problems of the prior art.

SUMMARY OF THE INVENTION

In accordance with a first aspect of the invention there is provided a computer-implemented method of providing suggested entries for a candidate journey in a vehicle logbook, comprising:

selecting one or more neighbour journeys based on a location of one or more end-points of the candidate journey and the one or more neighbour journeys;

determining an accuracy value indicative of a match between each neighbour journey and the candidate journey based on one or more attributes of each neighbour journey and the candidate journey; and providing at least one suggested entry for the candidate journey in the vehicle logbook based on the accuracy value associated with each neighbour journey.

The selecting of the one neighbour journeys may comprise determining a geographic region based on a location of one or more end-points of the candidate journey, wherein the one or more neighbour journeys are selected according to an end-point of the neighbour journey residing within the geographic region. The end-point of the candidate journey may be a destination location and the end-point of the neighbour journey may be a destination location. The geographic region may be centred upon the location of the one or more end-points of the candidate journey.

The accuracy value may be determined based on at least one end-point of the neighbour journey residing within a geographic region associated with an end point of the candidate journey. The geographic region may be associated with a start location of the candidate journey and the start location of the neighbour journey. The accuracy value may be weighted toward a correspondence between the least one end-point of the neighbour journey with the end point of the candidate journey.

In an embodiment, the accuracy value is determined based on a temporal match between each neighbour journey and the candidate journey. The temporal match may be determined based on one or more of: a weekday of each neighbour journey and the candidate journey; an end time of each neighbour journey and the candidate journey being within a predetermined period of time; and an end time of each neighbour journey and the candidate journey being not more than a predetermined period of time.

The accuracy value may be determined based on a category associated with each neighbour journey. The category may be indicative of a type of the neighbour journey. The category may be one or more of business, commuting and private.

The invention further encompasses computer software which, when executed by a computer, is arranged to perform the method according to the first aspect as described above, including any one or more of its associated optional and preferred steps. The computer software may be stored on a, e.g. non-transitory, computer-readable medium.

In accordance with another aspect of the invention there is provided a computing device, comprising:

a memory storing a logbook application; and a processor operatively arranged to execute the logbook application, wherein the logbook application is arranged to: select one or more neighbour journeys stored in a data storage structure accessible to the logbook application based on a location of one or more end-points of a candidate journey and the one or more neighbour journeys; determine an accuracy value indicative of a match between each neighbour journey and the candidate journey based on one or more attributes of each neighbour journey and the candidate journey; and provide at least one suggested entry for the candidate journey in the vehicle logbook based on the accuracy value associated with each neighbour journey.

The computing device may be a mobile computing device, and which may have a display for displaying the at least one suggested entry for the candidate journey to the user. In other embodiments, the computing device may be a server, and which may comprise communication means arranged to transmit the at least one suggested entry for the candidate journey to a user device, e.g. a desktop computer or mobile device, for display thereon.

The present invention in this further aspects may include any or all of the preferred and optional features described herein as appropriate.

As will be appreciated by those skilled in the art, all of the described aspects and embodiments of the present invention can, and preferably do, include as appropriate, any one or more or all of the preferred and optional features described herein.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described by way of example only, with reference to the accompanying figures, in which.

DETAILED DESCRIPTION OF PREFERRED EMBODIMENTS

Figure 1:
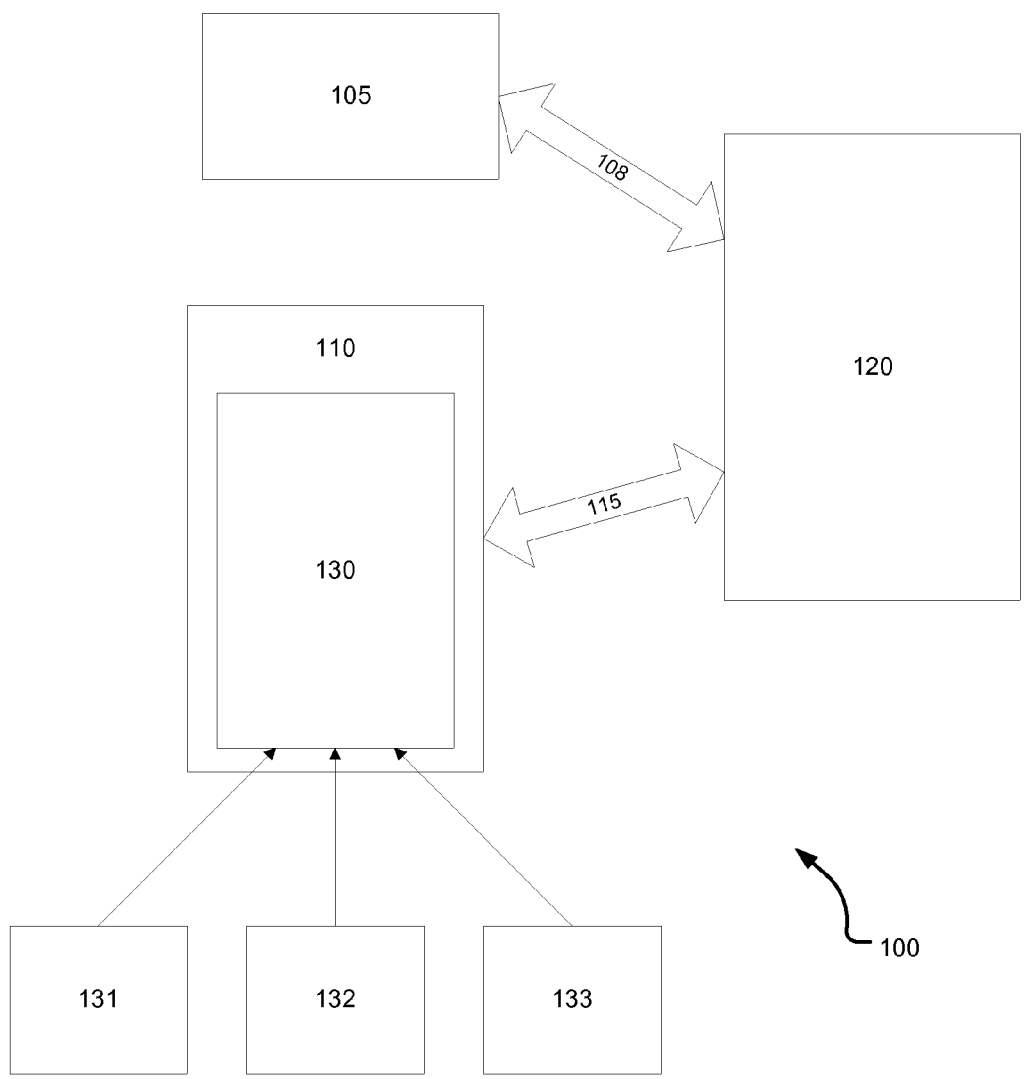
FIG. 1 shows a system according to an embodiment of the invention.

FIG. 1 schematically illustrates a system 100 according to an embodiment of the invention. The system 100 comprises a mobile device 110 and a server 120 which are communicatively coupled via a communications channel 115 to exchange data. The mobile device 110 is a portable device capable of executing, on a processor thereof, a logbook application 130 which is stored in a memory of the mobile device 110. In the embodiment illustrated in FIG. 1, the system 100 further comprises a vehicle monitoring device 105 positioned, in use, in a vehicle, and which comprises means for determining a location of the device 105 (and thus the vehicle in which it is positioned). The location determining means could be of any type. For example, the device 105 could comprise means for accessing and recessing information from WiFi access points or cellular communication networks, and using this information to determine its location. In preferred embodiments, however, the device comprises a global navigation satellite systems (GNSS) receiver, such as a GPS receiver, for receiving satellite signals indicating the position of the receiver at a particular point in time, and which preferably receives updated position information at regular intervals.

In the embodiment shown in FIG. 1, the vehicle monitoring device 105 is in communication with the server 120 via the communications channel 108, e.g. for the transmission of information concerning the location of the vehicle over time. The communications channel 105 may comprise a mobile telecommunications network, and the device 105 preferably comprises a mobile telecommunications module, such as a GSM or GPRS modem, for communicating over the network. It is also envisaged in other embodiments, however, that the vehicle monitoring device 105 may comprise a short-range communications module, such as a Bluetooth device, for communicating with the mobile device 110. The location information from the device 105 can then be passed to the server 105 using the communication channel 115. In yet other embodiments, the functionality of the location monitoring device 105 may be performed by the mobile device 110 itself, e.g. the mobile device 110 may comprise location determining means.

Figure 7:
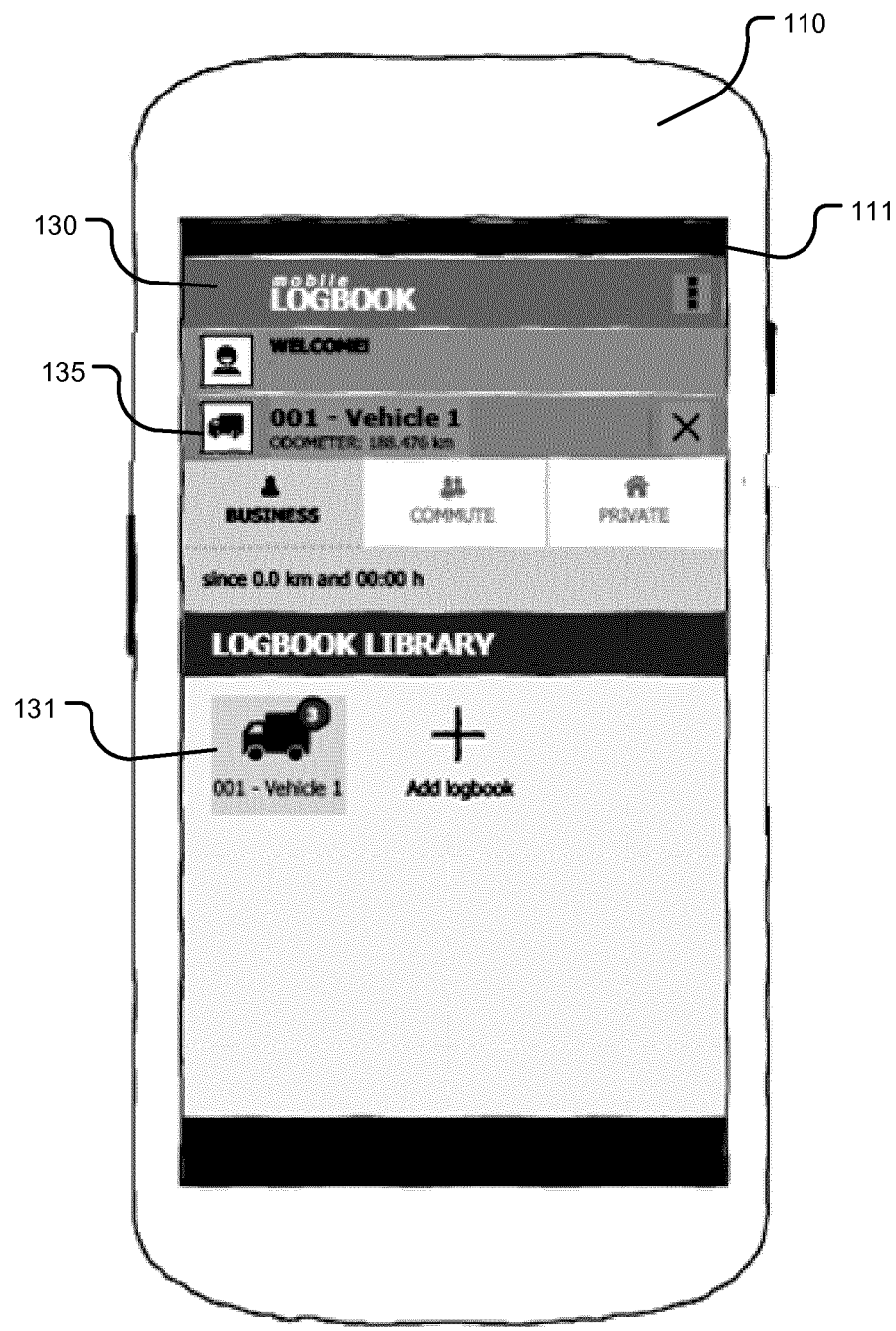
FIG. 7 shows a screenshot of a logbook software application according to an embodiment of the invention.
Figure 8:
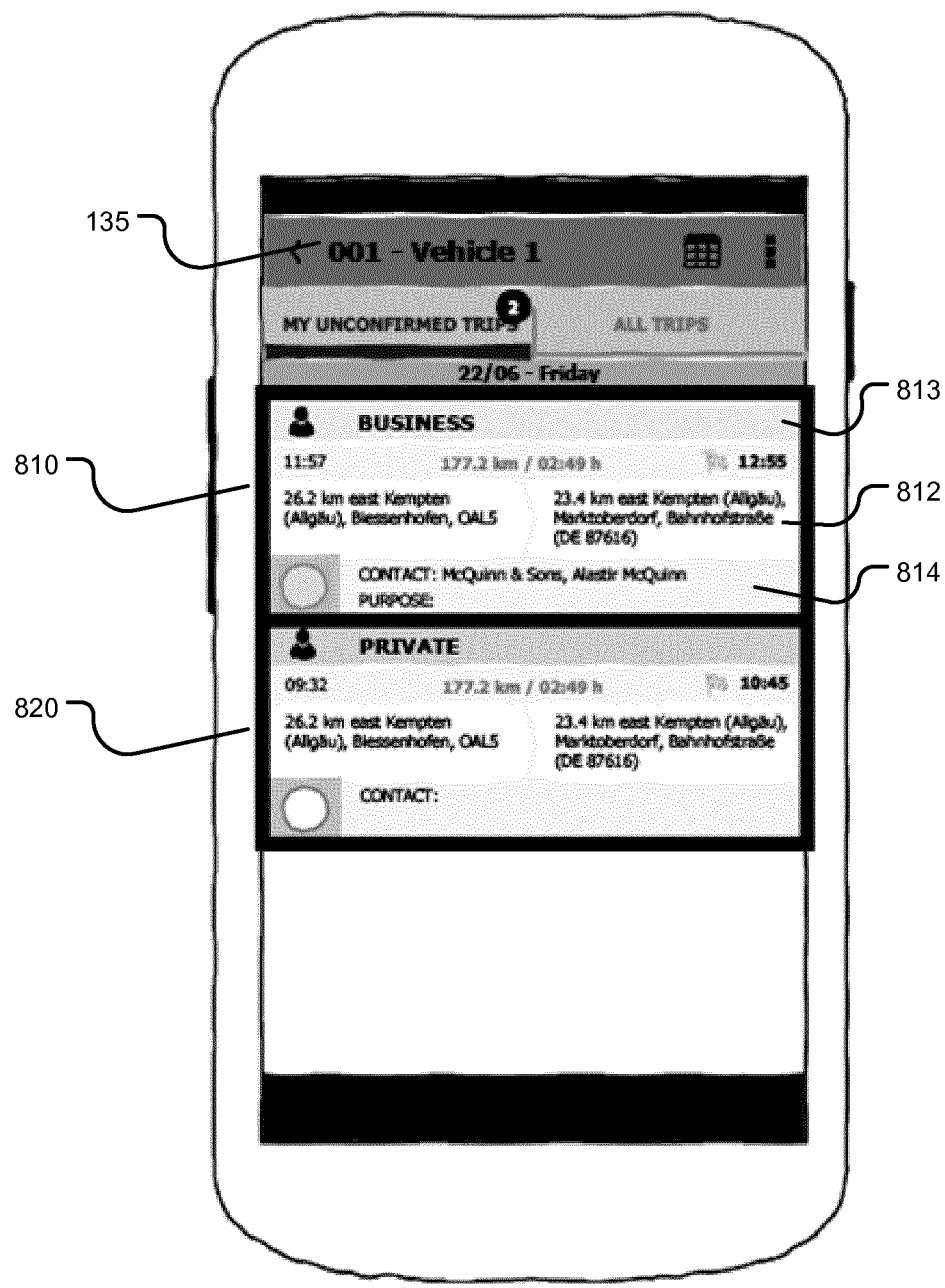
FIG. 8 shows a further screenshot of a logbook software application according to an embodiment of the invention.

The mobile device 110 may be a mobile telephone, smart phone, personal digital assistant, laptop or tablet computer, portable navigation device (PND), or the like. An exemplary mobile device 110 is shown in FIGS. 7 and 8 executing the logbook application 130 which is operably displayed on a display screen 111 of the mobile device 110.

The logbook application 130 is a software application arranged to operatively record usage data regarding the usage of one or more vehicles. In particular the logbook application 130 is arranged to store usage data indicative of journeys made by each vehicle and attributes associated with those journeys, as will be explained. The usage data may be shared with the server 120 via the communications channel 115. In such distributed systems the server 120 may communicate with a plurality of mobile devices 1110 each operatively executing the logbook application 130 such that the server 120 receives usage data from the plurality of mobile devices 130. However it will be realised that embodiments of the invention are not restricted to such distributed systems and that in some embodiments the logbook application 130 executes in a standalone manner on the mobile device 100.

The logbook application illustrated in FIG. 1 is arranged to maintain usage data in the form of a logbook 131, 132, 133 for each of three vehicles. It will be realised that this is merely illustrative and the logbook application may maintain a logbook for one or more vehicles. As shown in FIG. 7 the logbook application 130 is associated with one logbook 131 associated with a vehicle 135. Embodiments of the invention will be illustrated with reference to one logbook but it will be realised that this is merely exemplary.

As noted above, the mobile device 110 comprises, or is communicable, with location determining functionality which can be used to record one or more journeys made by a vehicle. In other words, the mobile device 110, in embodiments, records and/or receives journey data indicative of one or more journeys made by a vehicle. The logbook 131 therefore comprises journey data associated with one or more previous journeys made by the vehicle. The data may be stored locally in the memory of the mobile device 110 or on the server 120 accessible to the logbook application 130 via the communications channel 115.

The journey data comprises data relating to at least a start location and a destination location of each journey and a category associated with each journey. The category is indicative of the type of journey and may be selected as one of a plurality of categories supported by the logbook application 130. In one embodiment the categories are commuting, private and business (as shown in FIG. 7). The journey data may further comprise one or more attributes associated with each journey. In one embodiment the attributes include a contact visited (e.g. the name of a person or company visited in the journey) and a purpose associated with each journey. In one embodiment for journeys of the business category it is mandatory for a user to include the contact and purpose attributes associated with the journey (whereas for journeys of the private and commuting categories the contact and purpose attributes may be voluntary). In preferred embodiments, the journey data further comprises time data associated with the one or more journeys. For example, the journey data may comprise data indicative of the time at which the vehicle was at the destination location, and optionally data indicative of the time at which the vehicle was at the start location.

Embodiments of the invention provide a more convenient logbook application by suggesting the type of a new journey and/or one or more other attributes of a new journey to a user. The journey is recorded by the user via the navigational functionality. Based on the location data of the new journey and previous journeys the logbook application 130 suggests attributes of the journey for entry into the logbook 131, as will be appreciated. It will be realised that the logbook application 130 may be executed on another computing device from the mobile device 110. The logbook application 130 may be executed on a computing device having received the location data of the journey from the mobile device 110 or navigation functionality.

Figure 2:
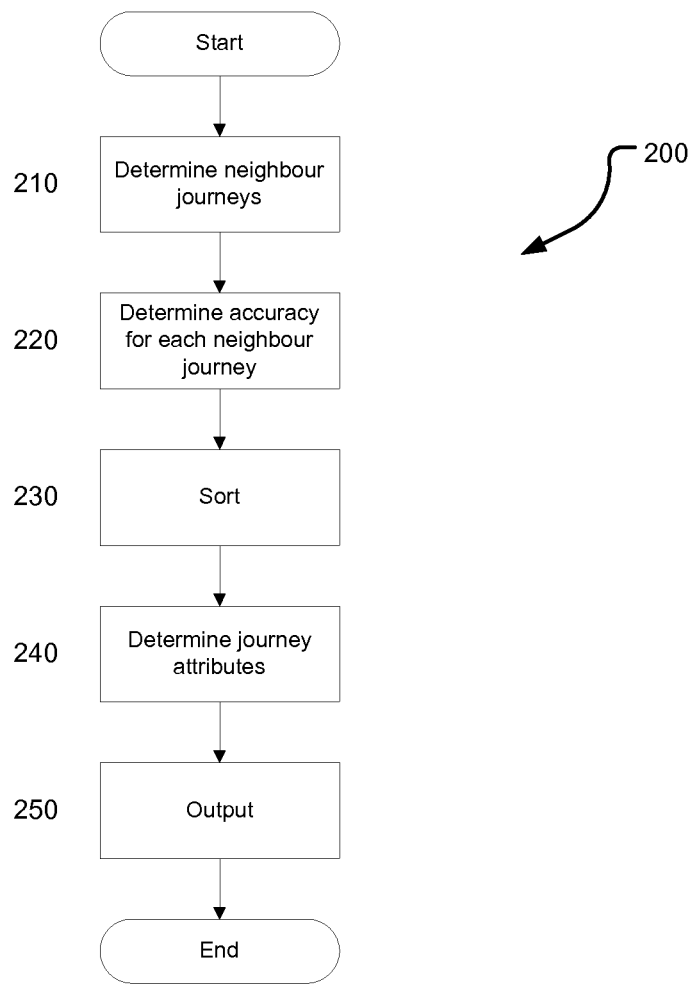
FIG. 2 shows a method for determining suggested entries for a candidate journey in a vehicle logbook according to an embodiment of the invention.

FIG. 2 illustrates a method 200 according to an embodiment of the invention. The method 200 is arranged to provide one or more suggested attribute entries for the logbook 131 associated with a vehicle based on one or more attributes of a candidate journey for which it is desired to record in the logbook. The method 200 will be explained with further reference, in particular, to FIGS. 3 to 6.

In step 210 one or more neighbour journeys are selected based on one or more attributes of the candidate journey. A neighbour journey is a journey previously stored in the logbook which is at least partly in the geographic region of the candidate journey and, hence, at least partly neighbouring the candidate journey. The one or more neighbour journeys are selected in embodiments of the invention with reference to one or more end-point locations of the candidate journey, e.g. start location and/or destination location, as will be explained with reference to FIG. 3.

Figure 3:
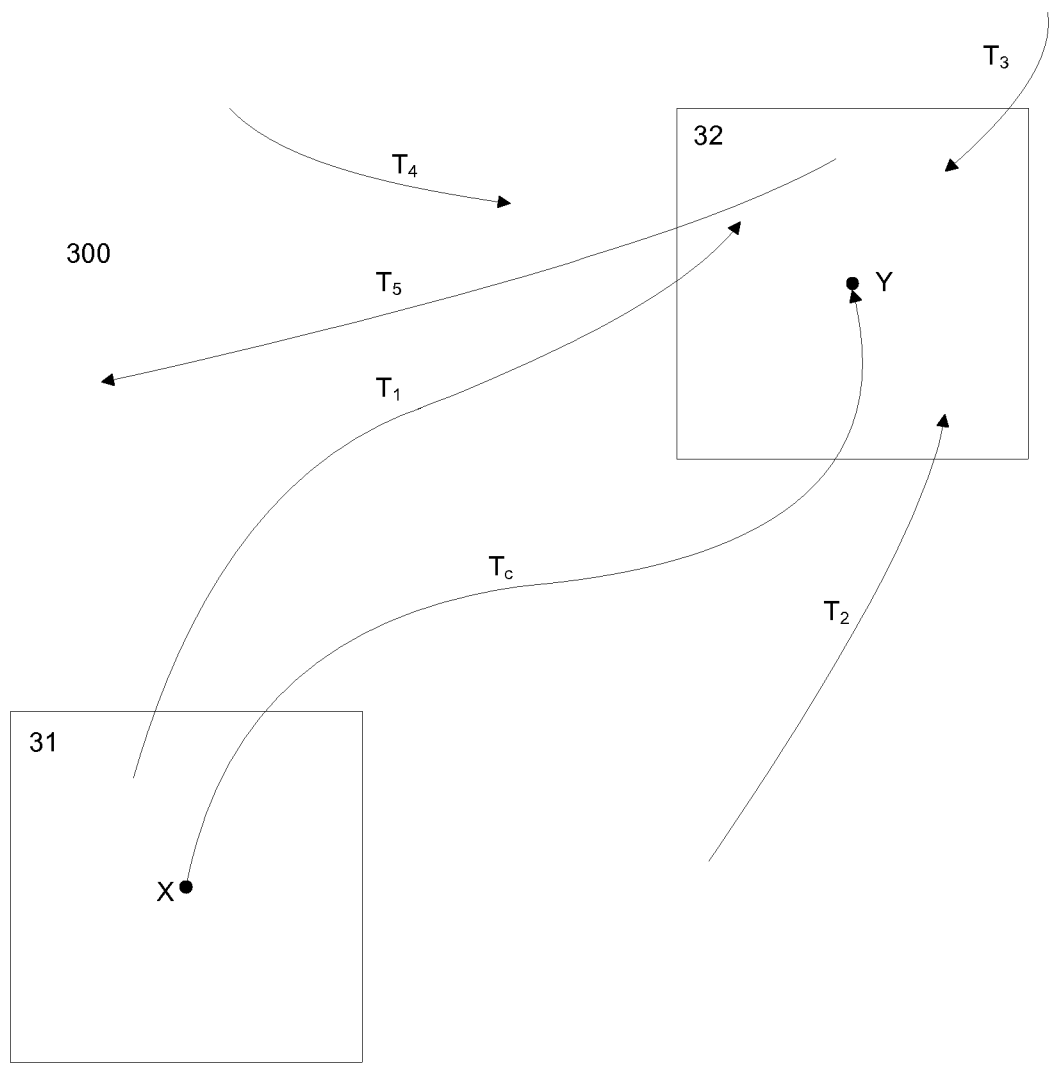
FIG. 3 shows an illustration of digital map data and journeys according to an embodiment of the invention.

FIG. 3 illustrates digital map data representative of a geographic region 300. A candidate journey is indicated as $T_c$. The candidate journey represents a path traversed by the vehicle between a start location X and a destination location Y via one or more road segments.

As noted above, it is desired by the user to complete the logbook 131 with an entry for the candidate journey $T_c$. The logbook entry for the candidate journey may comprise data indicative of the start location X, the destination location Y and a category of the journey, wherein the category may be selected from a plurality of predetermined categories such as business, pleasure and commuting. It will be realised that these are illustrative categories and that others may be envisaged.

Based on the start and destination locations, X and Y, and the journey travelled, the logbook entry may further include data indicative of distance travelled i.e. length of the journey and/or travelling time. Particularly for journeys of the business category the logbook may also record attribute data, for example a contact visited and a purpose of the journey, e.g. customer visit. The logbook may further record temporal data associated with the journey, for example a start time and an end time of the journey.

One or more neighbour journeys are selected for the candidate journey $T_c$ in step 210. In embodiments of the invention the neighbour journeys are selected as having at least an end location which is at a location which is least similar to the end location of the candidate journey $T_c$. In embodiments of the invention a geographic region 31, 32 is determined around each of start destination A and destination location B of the candidate journey. The geographic region may be a region within a predetermined radius of the start X and destination locations Y. However in other embodiments a quadrilateral such as square may be used to define the geographic region based around each of the start X and destination Y locations of the candidate journey. In the embodiment shown in FIG. 3 a first region 31 is defined around the start location X and a second region 32 is defined around the destination location Y. The square may be 100 m by 100 m, although other dimensions may be chosen. The choice of a square may be preferred over, for example, a circle to reduce the computation required to select the geographic regions 31, 32.

FIG. 3 illustrates four possible neighbour journeys proximal to the candidate journey. A first neighbour journey $T_1$ may be selected as having both its start and destination locations within the first and second geographic regions 31, 32. Second and third neighbour journeys $T_2$, $T_3$ may be selected as having their destination locations within the geographic region 32 defined around the destination location B of the candidate journey $T_c$. However the fourth journey $T_4$ is not selected as a neighbour journey as neither its start, nor destination, locations are within the first and second geographic regions 31, 32. Similarly the journey $T_5$ is not selected because, although its start location is within the second geographic region 32, its destination location is not. Therefore in step 210 neighbour journeys $T_1$, $T_2$ and $T_3$ are selected according to an embodiment of the invention.

Returning to FIG. 2, the method 200 further comprises step 220 in which an accuracy value for each neighbour journey is determined. The accuracy value is indicative of a match between the respective neighbour journey and the candidate journey $T_c$. A method 400 of determining an accuracy value of the neighbour journeys $T_1$, $T_2$ and $T_3$ selected in step 210 will now be explained with reference to FIG. 4.

At a start of the method 400 one of the neighbour journeys $T_x$, is selected, for example journey $T_1$. In step 305 it is determined whether the start location of the selected neighbour journey is the same as the candidate journey $T_c$. In one embodiment a tolerance is applied to the comparison of the candidate and neighbour journeys. The tolerance may be applied by determining whether the start location of the neighbour journey, e.g. $T_1$, is within a geographic region of predetermined size defined around the start location of the candidate journey $T_c$. The geographic region may be the first geographic region 31 previously explained with reference to FIG. 3, and defined using any of the exemplary techniques described above. If the start of the neighbour journey $T_x$ is within the geographic region 31 then the method moves to step 310, as it would for the first neighbour journey $T_1$. However, for the second neighbour journey $T_2$ the method moves to step 306, since the start location of the neighbour journey is not within the first geographic region 31.

In step 310 the accuracy value associated with the neighbour journey is incremented by a predetermined value A. The accuracy value associated with each neighbour journey was initialised to a predetermined value, for example 0. The value A may be relatively large in comparison to other values used in the method (e.g. values B, C, D and E described below) such that the method 400 weights neighbour journeys starting at the same location as the candidate journey with a relatively large accuracy.

In step 306 it is determined whether a category associated with the neighbour journey is one of a predetermined category, and preferably whether the neighbour journey is a commuting journey. If the neighbour journey is of the predetermined category, i.e. it is associated with the commuting category, the method moves to step 307 where the neighbour journey is removed from the set of neighbour journeys being considered. The neighbour journey is removed in such embodiments because commuting journeys are expected to be between the same start and destination locations. If the neighbour journey is not of the predetermined category the method moves to step 315.

In step 315 it is determined whether the neighbour journey is associated with a predetermined period of time that is equivalent to a period of time associated with the candidate journey. The predetermined period of time may be the same weekday, although it will be realised that other periods of time may be considered. If the neighbour journey is not the same weekday, or other time period, the method moves to step 325. However if the neighbour journey is the same weekday, or other time period, then the method moves to step 320. In step 320 the accuracy value associated with the neighbour journey is incremented by a predetermined value B.

In step 325 it is determined whether an end time of the neighbour journey is the same as the candidate journey. In one embodiment, the end time of the neighbour journey may be considered the same as the end time of the candidate journey if it is within a predetermined tolerance, such as ±2 hours, although other values may be used. If the end time of the neighbour journey is not the same, or within the predetermined tolerance, of the candidate journey then the method moves to step 335. However if the end time of the neighbour journey is the same as, or within the predetermined tolerance of, the candidate journey the method moves to step 330. In step 330 the accuracy value associated with the neighbour journey is incremented by a predetermined value C.

In step 335 it is determined whether the end time of the neighbour journey is not older than a predetermined time from the end time of the candidate journey. The predetermined time may be a predetermined number of days, for example 14 days, although other numbers of days may be used. If the neighbour journey is not older than the candidate journey by the predetermined number of days the method moves to step 340. However if the neighbour journey is older than the candidate journey by more than the predetermined number of days the method moves to step 345. Step 335 increases the accuracy value of neighbour journeys which were completed more recently in comparison to the candidate journey. In step 340 the accuracy value associated with the neighbour journey is incremented by a predetermined value D. In embodiments, the values of B, C and D are the same (and typically small in comparison to the value of A), but it will be realised that one or more of the values may be different as desired.

In step 342 the determined accuracy value for the neighbour journey is stored in a memory, together with a identifier capable of identifying the neighbour journey.

In step 345 it is determined whether another neighbour journey is available from those selected in step 210. For example, it may be determined whether a next neighbour journey $T_{x+1}$, e.g. $T_{1+1}=T_2$, is available. It will be realised that neighbour journeys do not always have to be successively incrementing in number. If another neighbour journey is available then that neighbour journey is selected in step 350 for a further repetition of the method 400. However if no further neighbour journeys remain the method 400 ends.

Figure 4:
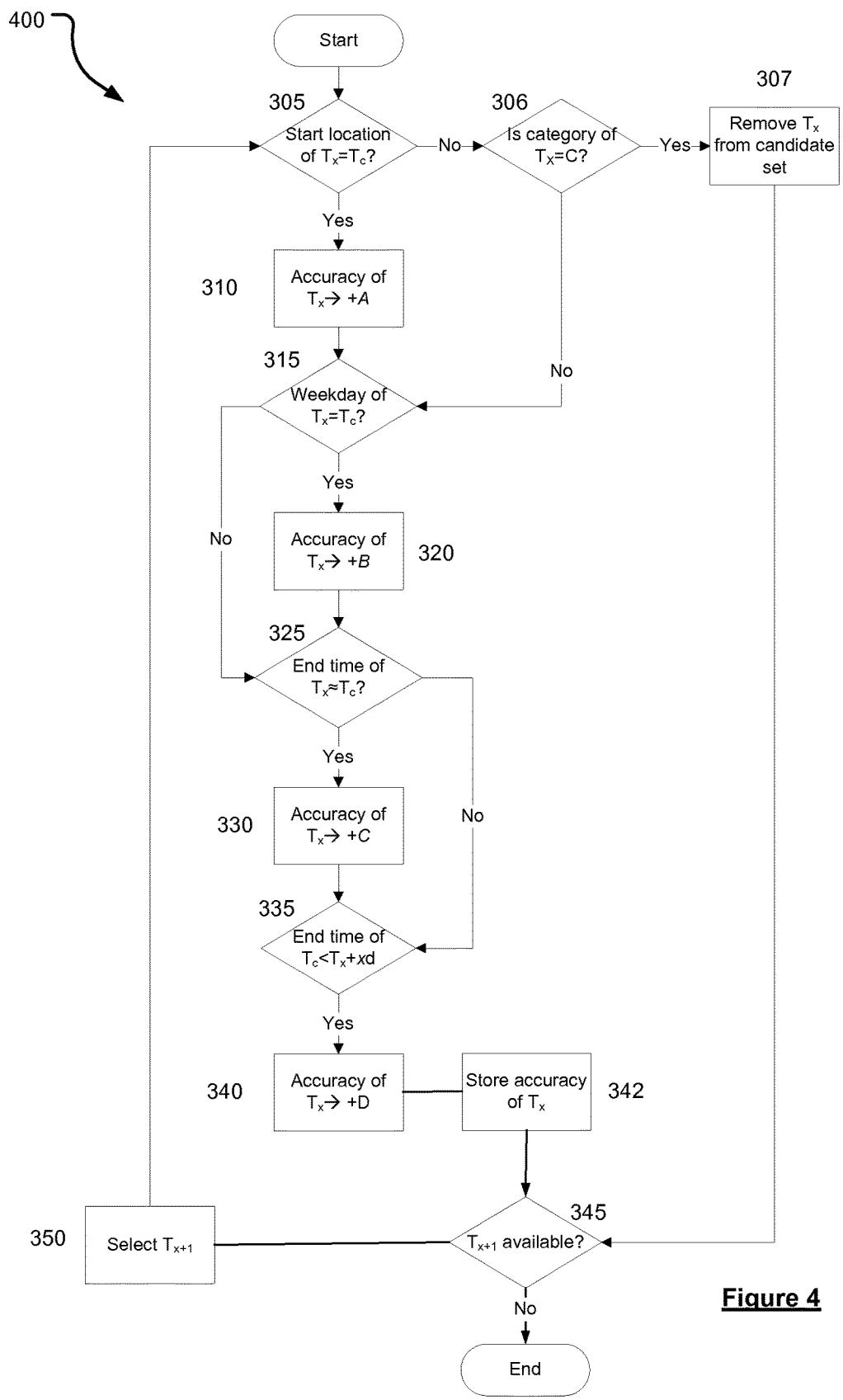
FIG. 4 shows a portion of the method of FIG. 2 according to an embodiment of the invention illustrating the determination of initial accuracy values for each of a plurality of neighbour journeys.

Returning to FIG. 2 following completion of the method 400 shown in FIG. 4, the method 200 further comprises a step 230 of sorting the neighbour journeys based, at least initially, on the accuracy values determined in step 220.

As will be appreciated the accuracy values determined in step 220 are based on data associated each journey, i.e. the start location, the destination location, the journey category (business, commute, private) and the time of the journey. Certain journeys may, as discussed above, have additional attributes such as contact and purpose information. In embodiments, the accuracy values determined in step 220 may be adjusted to take account of these additional attributes.

Figure 5:
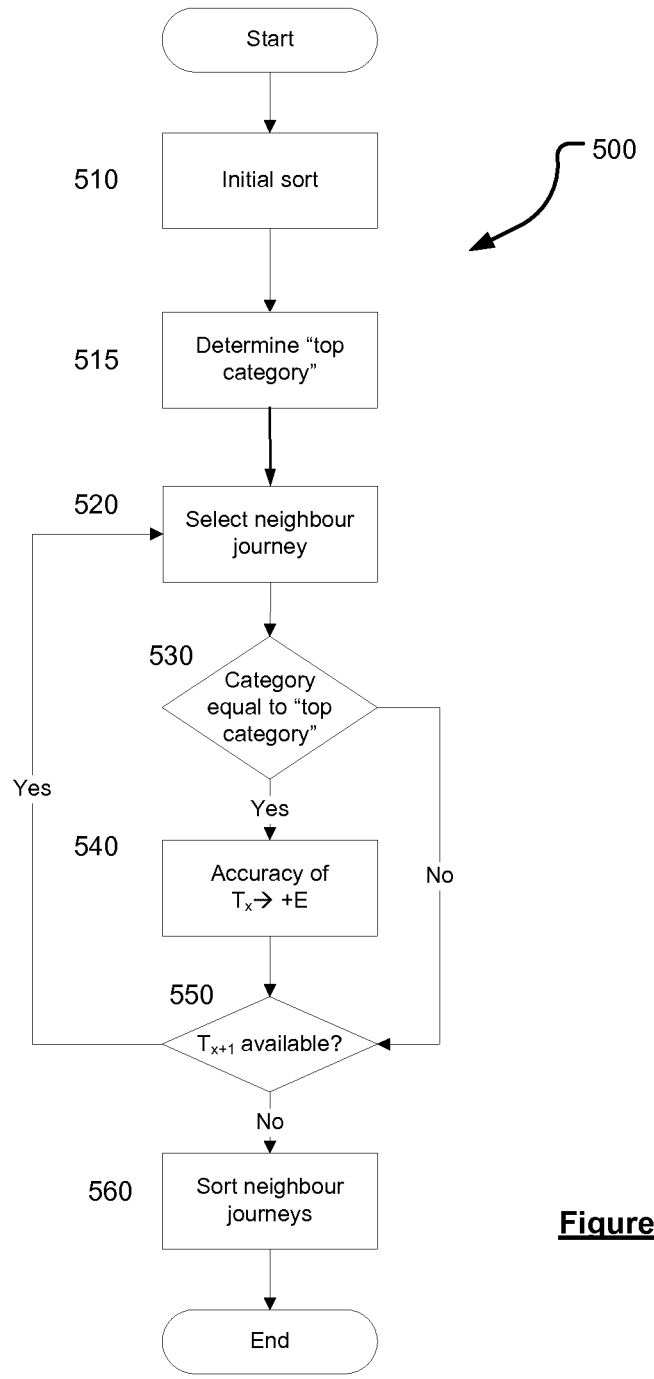
FIG. 5 shows a portion of the method of FIG. 2 according to an embodiment of the invention illustrating the determination of a list of neighbour journeys ranked according to determined accuracy values.
Figure 6:
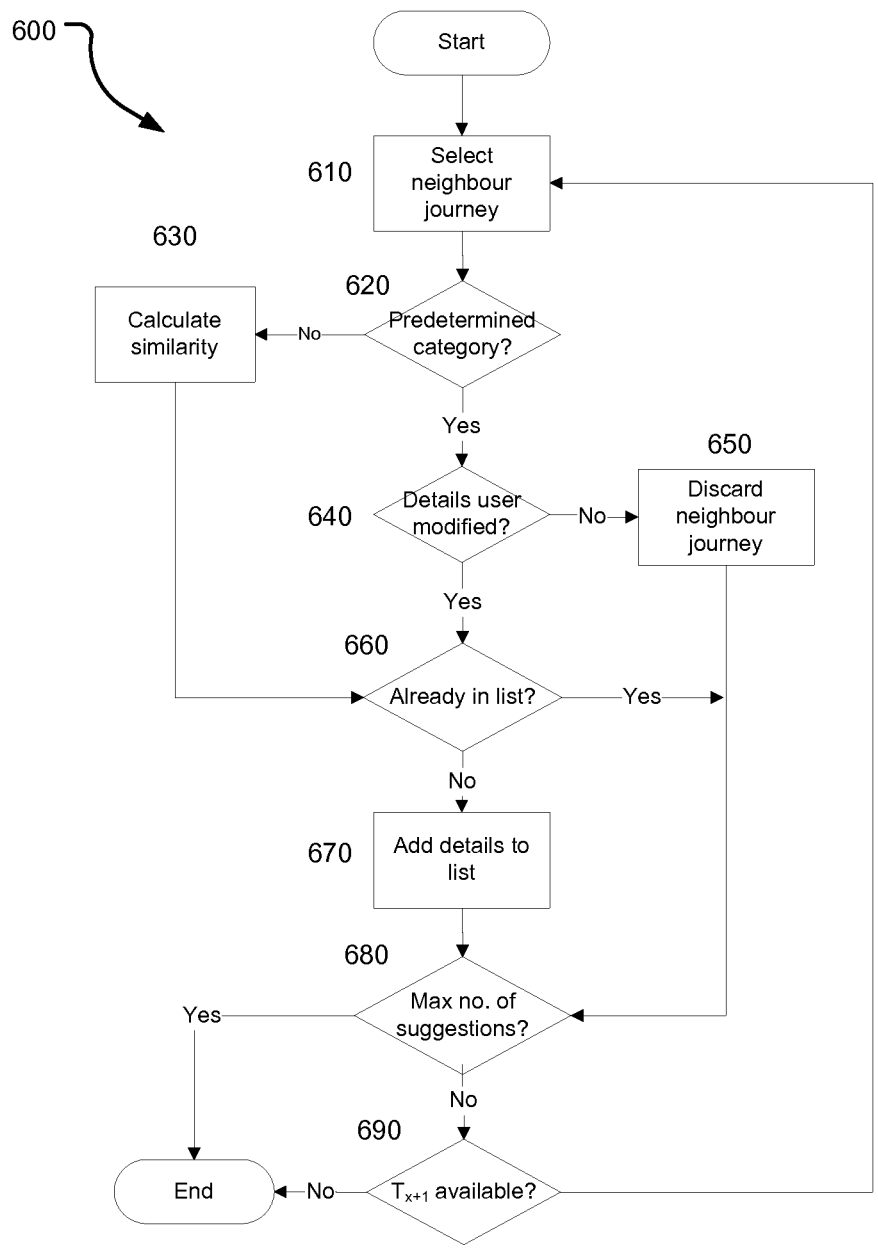
FIG. 6 shows a portion of the method of FIG. 2 according to an embodiment of the invention illustrating the determination of the entries to be provided to the user.

An embodiment of a method 500 which may be performed in step 230, and which is shown in FIG. 5. The method 500 increases an accuracy of neighbour journeys that have the same category as that of the highest ranking neighbour journey based on the accuracy values determined in step 220. The accuracy of such journeys is increased to enhance the chances of relevant contact and/or purpose being determined for the candidate journey.

The method 500 comprises a step 510 of performing an initial sort of the neighbour journeys based on the accuracy value determined in step 220. In some embodiments if the accuracy of two neighbour journeys is equal then the journeys may additionally be sorted based on their respective end times, such that the most recent neighbour journey(s) is sorted above an older neighbour journey(s).

In step 515 the category of the highest ranking neighbour journey from the initial sort step 510 is determined. This category is referred to as the "top category".

In step 520 a neighbour journey $T_x$ is selected. In a first iteration of step 520 the selected neighbour journey may be a first neighbour journey in the sorted list determined in step 510. Subsequently in each iteration of step 520 a next descending neighbour journey may be selected.

In step 530 it is determined whether a category associated with the selected neighbour journey is the same as the "top category" determined in step 515. If the neighbour journeys have the same category then the accuracy associated with the selected neighbour journey is incremented by a predetermined value E. Otherwise the method moves to step 550. In embodiments, the value of E is the same as that of values B, C and D described above, and again is typically small in comparison to the value of A, but it will be realised that E can be of any value as desired.

In step 550 it is determined whether further neighbour journeys remain. If one or more further neighbour journeys remain the method returns to step 520 where another neighbour journey is selected. If no further neighbour journeys remain the method moves to step 560 where the neighbour journeys are sorted again, as in step 520, based on updated accuracy values.

Returning again to step 240 of FIG. 2, one or more attributes of neighbour journeys are selected in order to provide one or more suggested attributes for the candidate journey. In some embodiments, a predetermined maximum number of suggestions are provided. The maximum number of suggestions may be five, although it will be realised that this number is merely exemplary. In some embodiments, the suggested attributes may comprise a category associated with the journey, a contact associated with the journey and/or a purpose associated with the journey. The contact and/or purpose may only be suggested in one embodiment if the category is business. However it will be realised that only some of these attributes may be suggested and further or other attributes may be suggested. An embodiment of a method 600 performed in step 240 will be explained with reference to FIG. 6.

The method 600 comprises a step 610 of selecting a neighbour journey. In the first iteration of step 610 the selected neighbour journey may be a first neighbour journey in the sorted list determined in step 230. Subsequently, in each iteration of step 610, a next descending neighbour journey in the sorted list may be selected.

In step 620 it is determined whether the selected neighbour journey is associated with one of one or more predetermined categories. The predetermined categories may be categories of commuting and private. If the neighbour journey is associated with one of the one or more predetermined categories the method moves to step 640.

In step 640 it is determined whether the neighbour journey is associated with one or more predetermined attributes that have been confirmed by the user. In some embodiments neighbour journeys of one or more categories, for example commuting and private neighbour journeys, may be stored in the logbook without contact and purpose attributes, or with contact and purpose attributes having zero value; this "empty" field being confirmed as correct by the user. In other embodiments commuting and private neighbour journeys may be stored in the logbook with contact and/or purpose attributes that have been confirmed and/or modified by the user. If the determination is negative (i.e. that the one or more predetermined attributes, e.g. contact and/or purpose information, has not been confirmed by the user) the method moves to step 650 wherein the neighbour journey is discarded. If the determination is positive the method moves to step 660.

The method arrives at step 630 if the category associated with the selected neighbour journey is not one of the one or more predetermined categories determined in step 620. In an embodiment where neighbour journeys are associated with one of three categories of commuting, private and business, the method arrives at step 630 where the neighbour journey is associated with the business category. In step 630 a similarity of the one or more attributes of the neighbour journeys, e.g. contact and/or purpose information, is determined to those already in the list. This may be achieved, in one embodiment, by comparing text strings with a degree of fuzzy logic such that, for example, text strings "Muller" and "Müller" are considered the same. This step attempts to ensure that the method does not result in the list containing variants of the same attribute value, e.g. different spellings of the same name.

In step 660 it is determined whether the one or more attributes, for example category, contact and purpose, are already present in the list. If the attributes are already present in the list the method moves to step 680. If, alternatively, the attributes are not already in the list, the method moves to step 670 where the one or more attributes are added to the list. Where there are a plurality of attributes, they may be added to the list associated together, i.e. as one suggestion including the plurality of attributes. For example the list may be formed as a triplet comprising a suggested category, contact and purpose.

In step 680 it is determined whether the list comprises a predetermined maximum number of suggestions, for example five suggestions. If the list comprises the maximum number the method ends. If the list is not full, i.e. comprising less than the maximum number of entries, the method moves to step 690.

In step 690 it is determined whether any further neighbour journeys exist. If not, the method ends. If one or more further neighbour journeys remain the method returns to step 610 where a next neighbour journey is selected.

Following the end of the method 600, step 250 of the method 200 shown in FIG. 2 is performed. In step 250 the one or more attributes in the list output by step 240 are provided to the user. The attributes may be provided as pre-completed entries on a form of a graphical user interface as will be explained.

As previously noted, FIG. 7 illustrates the logbook application 130 operatively executing on the mobile device 110. FIG. 8 illustrates an interface of the logbook application for storing details of new or unconfirmed journeys. The interface shown in FIG. 8 displays a journey entry for each of two unconfirmed journeys 810, 820. Each journey entry comprises an indication of the start location 811 and destination location 812 determined by the navigation functionality. An indication of start and end times, and a distance of the respective journey is also displayed. Each journey entry may further comprises a suggestion of a category 813, e.g. one of business, private and commute, and one or more further attributes such as the contact and purpose 814 of the journey provided by the method 200 of FIG. 2. The user may accept the suggested entries provided by the logbook application 130 thus saving time and encouraging use of the application to record journeys made by the vehicle.

It will be appreciated that whilst the steps of determining the suggested entries for a candidate journey in a vehicle logbook have been described above as occurring on the mobile device 110, the suggested entries could instead be determined at the server 120 and transmitted to the mobile device 110 via the communications channel 115. It will additionally be understood that the steps could occur on a combination of the mobile device 110 and the server 120 as desired.

It will also be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of providing suggested entries for a candidate journey in a vehicle logbook, comprising:
    selecting one or more neighbour journeys based on a location of one or more end-points of the candidate journey and the one or more neighbour journeys;
    determining an accuracy value indicative of a match between each neighbour journey and the candidate journey based on one or more attributes of each neighbour journey and the candidate journey; and
    providing one or more suggested entries for the candidate journey in the vehicle logbook based on the accuracy value associated with each neighbour journey, each of the one or more suggested entries comprising a respective combination of information about the candidate journey for updating the vehicle logbook to include a corresponding entry for the candidate journey.

2. The method of claim 1, wherein selecting of the one neighbour journeys comprises:
    determining a geographic region based on a location of one or more end-points of the candidate journey;
    wherein the one or more neighbour journeys are selected according to an end-point of the neighbour journey residing within the geographic region.

3. The method of claim 2, wherein end-point of the candidate journey is a destination location and the end-point of the neighbour journey is a destination location.

4. The method of claim 2, wherein the geographic region is centred upon the location of the one or more end-points of the candidate journey.

5. The method of claim 1, wherein the accuracy value is determined based on at least one end-point of the neighbour journey residing within a geographic region associated with an end point of the candidate journey.

6. The method of claim 5, wherein the geographic region is associated with a start location of the candidate journey and the start location of the neighbour journey.

7. The method of claim 5 wherein the accuracy value is weighted toward a correspondence between the least one end-point of the neighbour journey with the end point of the candidate journey.

8. The method of claim 1, wherein the accuracy value is determined based on a temporal match between each neighbour journey and the candidate journey.

9. The method of claim 8, wherein the temporal match is determined based on one or more of:
    a weekday of each neighbour journey and the candidate journey; an end time of each neighbour journey and the candidate journey being within a predetermined period of time;
    an end time of each neighbour journey and the candidate journey being not more than a predetermined period of time.

10. The method of claim 1, wherein the accuracy value is determined based on a category associated with each neighbour journey.

11. The method of claim 9, wherein the category is indicative of a type of the neighbour journey.

12. The method of claim 10, wherein the category is one or more of: business, commuting, and private.

13. A non-transitory computer-readable medium comprising instructions which, when executed by at least one processor of a computing device, causes the computing device to perform a method for providing suggested entries for a candidate journey in a vehicle logbook, the method comprising:
    selecting one or more neighbour journeys based on a location of one or more end-points of the candidate journey and the one or more neighbour journeys;
    determining an accuracy value indicative of a match between each neighbour journey and the candidate journey based on one or more attributes of each neighbour journey and the candidate journey; and
    providing one or more suggested entries for the candidate journey in the vehicle logbook based on the accuracy value associated with each neighbour journey, each of the one or more suggested entries comprising a respective combination of information about the candidate journey for updating the vehicle logbook to include a corresponding entry for the candidate journey.

14. A computing device, comprising:
    a memory storing a logbook application;
    a processor operatively arranged to execute the logbook application, wherein the logbook application is arranged to:
        select one or more neighbour journeys stored in a data storage structure accessible to the logbook application based on a location of one or more end-points of a candidate journey and the one or more neighbour journeys;
        determine an accuracy value indicative of a match between each neighbour journey and the candidate journey based on one or more attributes of each neighbour journey and the candidate journey; and
        provide one or more suggested entries for the candidate journey in the vehicle logbook based on the accuracy value associated with each neighbour journey, each of the one or more suggested entries comprising a respective combination of information about the candidate journey for updating the vehicle logbook to include a corresponding entry for the candidate journey.

15. The computing device of claim 14, wherein the computing device is a mobile computing device having a display, the processor being arranged to display the at least one suggested entry for the candidate journey on the display.

16. The method of claim 1, further comprising:
    upon receiving an indication of an acceptance of a given suggested entry from among the one or more suggested entries, updating the vehicle logbook to include the corresponding entry for the candidate journey based on the given suggested entry.

* * * * *